United States Patent
Schiller et al.

(10) Patent No.: US 10,668,671 B2
(45) Date of Patent: Jun. 2, 2020

(54) APPARATUS AND METHOD FOR DRAPING KNITTED FIBER FABRICS FOR CURVED PROFILED STRUCTURAL PARTS OF FIBER COMPOSITE MATERIAL

(71) Applicant: Airbus Operations GmbH, Hamburg (DE)

(72) Inventors: Jan Schiller, Wennigsen (DE); Axel Herrmann, Stade (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 15/921,514

(22) Filed: Mar. 14, 2018

(65) Prior Publication Data

US 2018/0200966 A1    Jul. 19, 2018

Related U.S. Application Data

(62) Division of application No. 13/264,207, filed as application No. PCT/EP2010/002288 on Apr. 14, 2010, now abandoned.

(Continued)

(30) Foreign Application Priority Data

Apr. 14, 2009 (DE) .................. 10 2009 017 361

(51) Int. Cl.
*B29C 70/30*   (2006.01)
*B29C 70/56*   (2006.01)
*B29K 105/24*  (2006.01)

(52) U.S. Cl.
CPC .............. *B29C 70/30* (2013.01); *B29C 70/56* (2013.01); *B29K 2105/243* (2013.01)

(58) Field of Classification Search
CPC ......... B29C 70/30; B29C 70/56; B29C 70/06; B29C 70/08; B29C 70/541; B29K 2105/243; B21D 25/02
See application file for complete search history.

(56) References Cited

U.S. PATENT DOCUMENTS 1,622,590 A * 3/1927 Jolstad .................. B21D 22/26
                                                    72/297
2,378,642 A   6/1945 Kopplin
(Continued)

FOREIGN PATENT DOCUMENTS

DE    2056477 A1    5/1972
DE   19537737 A1    4/1997
(Continued)

OTHER PUBLICATIONS

The International Search Report and Written Opinion established by the European Searching Authority dated Sep. 23, 2010 (Sep. 23, 2010) in connection with PCT/EP2010/002288.
(Continued)

*Primary Examiner* — Xiao S Zhao
*Assistant Examiner* — Ninh V Le
(74) *Attorney, Agent, or Firm* — Barnes & Thornburg LLP

(57) ABSTRACT

An apparatus for draping knitted fiber fabrics for curved profiled structural parts of fiber composite material includes a mold having a mold surface that corresponds to a portion of the desired profile geometry and curvature of the profiled structural part, a clamping device for tensioning a layer of a knitted fiber fabric along a tensioning line in a prestressed state, and a movement device for producing a relative movement between the mold and the clamped-in fabric layer such that the mold surface moves close to the fabric layer in a direction perpendicular to the tensioning line and, in the further course of the relative movement, pushes through the (Continued)

tensioning line such that the fabric layer completely covers the mold surface. The clamping device is equipped to load the fabric layer during the entire draping operation with a tensile force acting along the tensioning line.

16 Claims, 1 Drawing Sheet

Related U.S. Application Data

(60) Provisional application No. 61/169,064, filed on Apr. 14, 2009.

(56) References Cited

U.S. PATENT DOCUMENTS

| | | | | |
|---|---|---|---|---|
| 2,431,173 | A | * | 11/1947 | Hawkes ................. B21D 11/02 |
| | | | | 72/297 |
| 3,058,154 | A | | 10/1962 | Howard |
| 3,074,116 | A | | 1/1963 | Philip |
| 4,746,385 | A | | 5/1988 | Wagner |
| 4,800,111 | A | | 1/1989 | Pflug et al. |
| 4,946,640 | A | | 8/1990 | Nathoo |
| 5,458,476 | A | | 10/1995 | Medwin |
| 5,711,845 | A | | 1/1998 | Ozawa |
| 6,272,897 | B1 | * | 8/2001 | Ciranna ................. B21D 25/02 |
| | | | | 72/296 |
| 6,276,401 | B1 | * | 8/2001 | Wilson ................... F16L 58/04 |
| | | | | 138/172 |
| 7,128,869 | B2 | | 10/2006 | Habisreitinger et al. |
| 2005/0051923 | A1 | | 3/2005 | Warren |
| 2008/0098789 | A1 | | 5/2008 | Hori et al. |
| 2008/0128430 | A1 | * | 6/2008 | Kovach ................... B32B 27/00 |
| | | | | 220/586 |
| 2010/0263789 | A1 | * | 10/2010 | Graber ................... B29B 11/16 |
| | | | | 156/228 |

FOREIGN PATENT DOCUMENTS

| | | |
|---|---|---|
| DE | 19922799 A1 | 11/2000 |
| DE | 10035237 C1 | 9/2001 |
| DE | 102007058727 A1 | 6/2009 |
| GB | 2061177 * | 5/1981 |
| GB | 2061177 A | 5/1981 |
| WO | 0103927 A1 | 1/2001 |
| WO | 2008046618 A1 | 4/2008 |

OTHER PUBLICATIONS

Second Office Action of Counterpart Chinese Patent Application No. 201080016871.2 submitted as DeQi's English Summary, issued by the State Intellectual Property Office of P.R. China.

* cited by examiner

APPARATUS AND METHOD FOR DRAPING KNITTED FIBER FABRICS FOR CURVED PROFILED STRUCTURAL PARTS OF FIBER COMPOSITE MATERIAL

CROSS-REFERENCE TO RELATED APPLICATIONS

This is a Division of U.S. application Ser. No. 13/264,207, filed Dec. 8, 2011, which is the U.S. International phase of International Application No. PCT/EP2010/002288, filed Apr. 14, 2010, which claims priority to U.S. Provisional Application No. 61/169,064 filed Apr. 14, 2009, and German Application No. 102009017361.7, filed Apr. 14, 2009, the disclosures of which are all incorporated herein by reference in their entireties.

FIELD OF THE INVENTION

The invention relates to an apparatus and a method for draping knitted fiber fabrics for curved profiled structural parts of fiber composite material such as for example GFRP or CFRP. By the term "profiled structural parts" in the context of the invention are meant structure-defining components that provide for the structural strength of a body, i.e. components that may form part of the supporting structure of a body such as for example the fuselage of an aircraft.

BACKGROUND

Particularly in aircraft construction there has been for some time now increased investigation into the practicability of profiled structural parts of knitted fiber fabrics, by which are meant glass-fiber-reinforced (GFR) or carbon-fiber-reinforced (CFR) woven, nonwoven or knitted fabrics in for example mat- or band form. To form a profiled structural part of fiber composite material the fibers first have to be prefabricated and aligned in accordance with their required orientation. The prefabricated woven, nonwoven or knitted fabrics then have to be placed layer by layer, i.e. draped, into the desired mold. Particularly in the case of curved profiled structures this draping process is difficult and correspondingly laborious. In order to achieve curved geometries, the knitted fiber fabrics because of the differences in length between the outside edge and the inside edge have to be laid in arcs, which may lead to undesirable crease formation. A further difficulty is to observe the desired fiber orientation on the mold.

After draping, the multi-layer laminate structure obtained is fixed. This is effected conventionally in a so-called preform step, in which the laminate structure, powdered with a binding material that has a fixing effect deployed as a rule by the application of heat, is heated in order to cure the binding material. Alternatively, woven, nonwoven or knitted fabrics already impregnated with a binding material, so-called prepregs, may be used.

An application example of future profiled structural parts of fiber composite material are frames, such as are used in the fuselage and wings of an aircraft. Up till now, such frames manufactured from knitted fiber fabrics have had to be manufactured in a time-consuming manner by draping the individual woven layers carefully by hand onto an appropriate mold, where they are provisionally fixed and then baked by the application of heat into a preform. If frames made from knitted fiber fabrics are to be used in future in series aircraft construction, such a method of manufacture is too slow and too costly.

SUMMARY

The underlying object of the invention is to remedy this and indicate an apparatus and a method for draping knitted fiber fabrics for curved profiled structural parts of fiber composite material, by means of which apparatus and method a large number of such profiled structural parts may be draped faster and more economically in a reproducible quality.

This object is achieved according to the invention by an apparatus having the features of the accompanying claim 1 and by a method comprising the steps that are indicated in the accompanying claim 6.

The apparatus according to the invention accordingly comprises at least one mold having a mold surface that corresponds to at least one portion of the desired profile geometry and curvature of the subsequent profiled structural part. The mold surface in this case may be configured so as to correspond to the desired profile geometry and curvature of the complete profiled structural part that is to be produced. Alternatively, a plurality of molds each having a mold surface may be provided, in which case all of the mold surfaces together form the desired profile geometry and curvature of the subsequent profiled structural part.

The draping apparatus according to the invention further comprises at least one clamping device for clamping in at least one layer of a knitted fiber fabric along a tensioning line in a prestressed state. The clamping device may be configured so as to clamp in a single knitted fiber fabric layer but may alternatively be configured so as to jointly clamp in a plurality of superimposed knitted fiber fabric layers. The clamping device may also be configured so as to keep a plurality of layers of knitted fiber fabric clamped in separately and at a distance from one another along mutually parallel tensioning lines. Instead of one clamping device, a plurality of clamping devices may be used for this purpose. The clamping device or the plurality of clamping devices is used to clamp in, i.e. secure, each knitted fiber fabric layer along a tensioning line associated with the knitted fiber fabric layer in such a way that the clamped-in knitted fiber fabric layer is subject to tensile loading along the tensioning line, i.e. is held constantly under tensile stress along the tensioning line. Each knitted fiber fabric layer provided for clamping in is preferably prefabricated, i.e. is at least cut to a desired length.

Finally, the draping apparatus according to the invention comprises a movement device for producing a relative movement between the mold or the molds and the at least one clamped-in layer of the knitted fiber fabric in such a way that the mold surface of the mold (or the mold surfaces of the molds) moves close to the knitted fiber fabric layer in a direction perpendicular or at least approximately perpendicular to the tensioning line and, in the further course of the relative movement, pushes through the tensioning line to such an extent that the knitted fiber fabric layer or each knitted fiber fabric layer completely covers the mold surface (or the mold surfaces). If there is a plurality of knitted fiber fabric layers, then this means that the tensioning lines of all of the knitted fiber fabric layers are penetrated until the last knitted fiber fabric layer, i.e. the knitted fiber fabric layer that is situated furthest from the mold surface, rests completely on the mold surface.

According to a preferred configuration of the draping apparatus according to the invention, the clamping device keeps the knitted fiber fabric layer, or optionally a plurality of knitted fiber fabric layers, in a preformed state transversely of the tensioning line. For example, this preformed state may be a Z-shape, i.e. the knitted fiber fabric layer held under tensile stress by the clamping device has a Z-shaped cross section. Other cross-sectional shapes are of course equally possible, for example an L-shape, an S-shape etc. In this way, even profiled structural parts of fiber composite material that are of a more complicated shape may be draped easily and with high reproducibility.

The object stated in the introduction is achieved also by a method of draping knitted fiber fabrics for curved profiled structural parts of fiber composite material that comprises the following steps:

tensioning at least one layer of a knitted fiber fabric along a tensioning line, wherein during the entire draping operation a tensile force is exerted on the layer along the tensioning line, executing a relative movement to reduce a distance between a mold surface situated on a mold and the at least one knitted fiber fabric layer in such a way that the mold surface moves close to the knitted fiber fabric layer in a direction perpendicular or at least approximately perpendicular to the tensioning line, and continuing the relative movement until the tensioning line is penetrated and the knitted fiber fabric layer completely covers the mold surface. Preferably each knitted fiber fabric layer is prefabricated, i.e. is at least brought to a desired length before being tensioned along the tensioning line.

As already described previously in connection with the apparatus according to the invention, also in the method according to the invention a plurality of layers of knitted fiber fabric may be clamped either in a superimposed manner or separately and at a distance from one another along mutually parallel tensioning lines, in which case the relative movement is continued until each tensioning line has been penetrated and each knitted fiber fabric layer completely covers the mold surface. Equally, the knitted fiber fabric layer or some or all of the knitted fiber fabric layers may be clamped in such a way as to result in a predetermined cross-sectional shape, for example a z-shape, an L-shape, an S-shape etc.

Each knitted fiber fabric layer may be a so-called prepreg, i.e. a knitted fiber fabric layer previously impregnated with a binding agent. If a plurality of knitted fiber fabric layers are used, then one, some or all of the layers may be prepregs.

In the draping method according to the invention the actual draping operation is carried out at the point where the still freely tensioned knitted fiber fabric layer running tangentially towards the mold surface meets the mold and, there, in contact with the mold is forced into the curvature thereof. In other words, the mold imposes the profile geometry on each knitted fiber fabric layer. Differences in length between an optionally provided external- and internal flange of the knitted fiber fabric layer that result from the preset curvature are compensated likewise at this point by virtue of a differing degree of elongation of the external- and internal flange.

By means of the draping apparatus according to the invention and by means of the draping method according to the invention curved profiles of knitted fiber fabrics may be draped rapidly and easily. The quality of the preforms draped in this manner is very high and moreover reproducible. For a relatively low capital expenditure the draping operation may be highly automated because tried-and-tested and simple technologies may be used for the draping apparatus according to the invention. According to the invention it is therefore possible to manufacture curved profiles in large piece numbers, rapidly and to a high quality. The apparatus according to the invention and the method according to the invention are moreover usable for a multitude of different geometries and laminate structures. In the event of a change of geometry, the mold merely has to be modified accordingly.

In the context of the present invention the term "knitted fiber fabric" is not limited to knitted materials but also includes woven materials and nonwoven materials, for example bonded materials.

BRIEF DESCRIPTION OF DRAWINGS

An embodiment of the invention is described in detail below with reference to the accompanying, diagrammatic figures. The figures show.

DETAILED DESCRIPTION OF DRAWINGS

Figure 1:
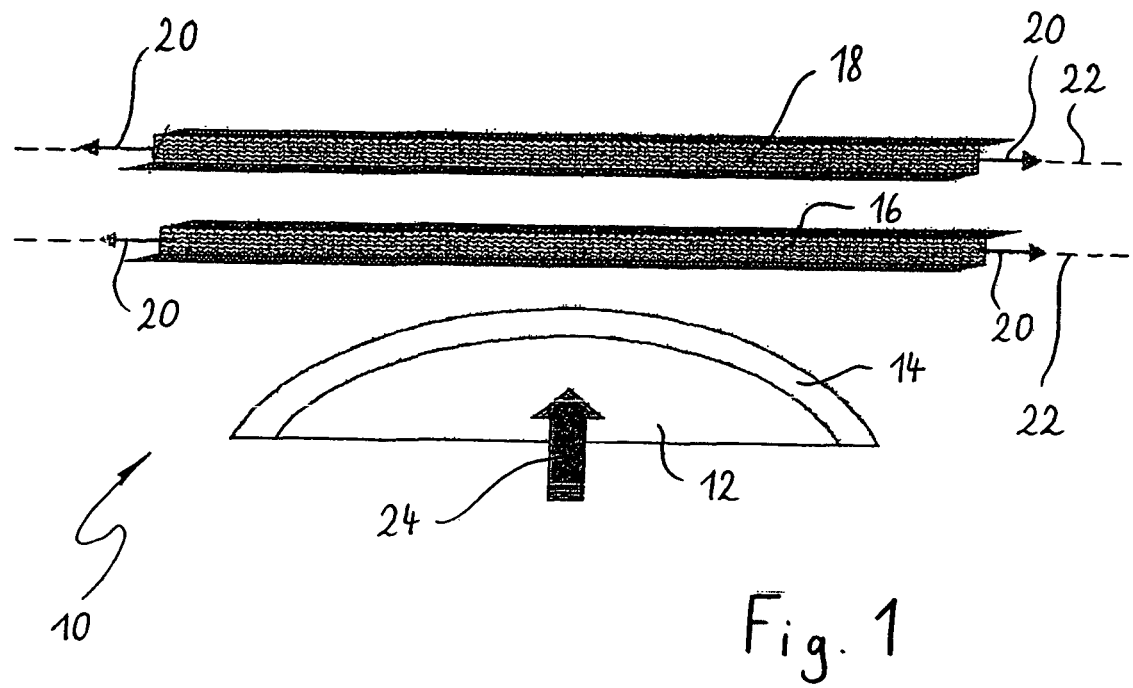
FIG. 1 a draping apparatus according to the invention with a mold in an initial state, and FIG. 2 the draping apparatus of FIG. 1 in an intermediate state with a first knitted fiber fabric layer partially draped thereon.

FIG. 1 diagrammatically shows an apparatus 10 for draping knitted fiber fabrics. The draping of the mostly web-shaped knitted fiber fabrics is an important step in the manufacture of curved profiled structural parts of fiber composite material such as CFRP and GFRP.

The draping apparatus 10 comprises a mold 12 having a mold surface 14 that in the illustrated embodiment has the shape of a frame for a wing of an aircraft. The mold surface 14 of the illustrated mold 12 is not only, as may be seen, curved in longitudinal direction but moreover has a three-dimensional cross section in a Z-shape, i.e. it consists of an—in cross-sectional direction—horizontally extending, first portion, from one end of which there extends in a vertically upward direction a second portion, which is adjoined by a third portion that again extends horizontally and hence parallel to the first portion.

Above and at a distance from the mold surface 14 two web-shaped layers 16, 18 of an individually prefabricated knitted fiber fabric extend in a direction that is parallel to the longitudinal extent of the mold surface 14. The two knitted fiber fabric layers 16, 18 are held by a clamping device, which here is merely symbolized by arrows 20 and keeps each knitted fiber fabric layer 16, 18 under tensile stress along an associated tensioning line 22. Each tensioning line 22 extends in longitudinal direction of the associated knitted fiber fabric layer 16 or 18 and hence parallel to the longitudinal extent of the mold surface 14.

For clamping in each knitted fiber fabric layer 16, 18 the clamping device comprises non-illustrated clamping elements, in which in each case one end of the knitted fiber fabric layer 16 or 18 is fastened in such a way that the corresponding knitted fiber fabric layer may be placed under tensile stress by the clamping device. For example, these clamping elements may be clamp-shaped elements, which clamp one end of a knitted fiber fabric layer tightly between two jaws.

As represented, each knitted fiber fabric layer 16, 18 is held prestressed by the clamping device in a Z-shaped configuration corresponding to the shape of the mold surface 14. The two knitted fiber fabric layers 16, 18 are moreover spaced apart from one another. Instead of one clamping device, which keeps the illustrated two knitted fiber fabric layers 16, 18 and optionally further knitted fiber fabric layers clamped in, a plurality of clamping devices may be used, which keep in each case only one knitted fiber fabric layer clamped in.

In order to drape the two knitted fiber fabric layers 16, 18 onto the mold surface 14, the mold 12 is movable by means of a movement device symbolized by an arrow 24 towards the knitted fiber fabric layers 16, 18 in a direction that, here, runs perpendicular to the tensioning lines 22. Depending on the application, this direction of motion may however also differ from the said perpendicular. As the mold 12 travels in the direction of the knitted fiber fabric layers 16, 18, first the middle (viewed in longitudinal direction) of the mold surface 14 comes into contact with the first knitted fiber fabric layer 16 and then, as the mold 12 continues to move in the said direction, carries along the clamped knitted fiber fabric layer 16, with the result that the knitted fiber fabric is applied exactly against the mold surface 14 (see FIG. 2).

Figure 2:
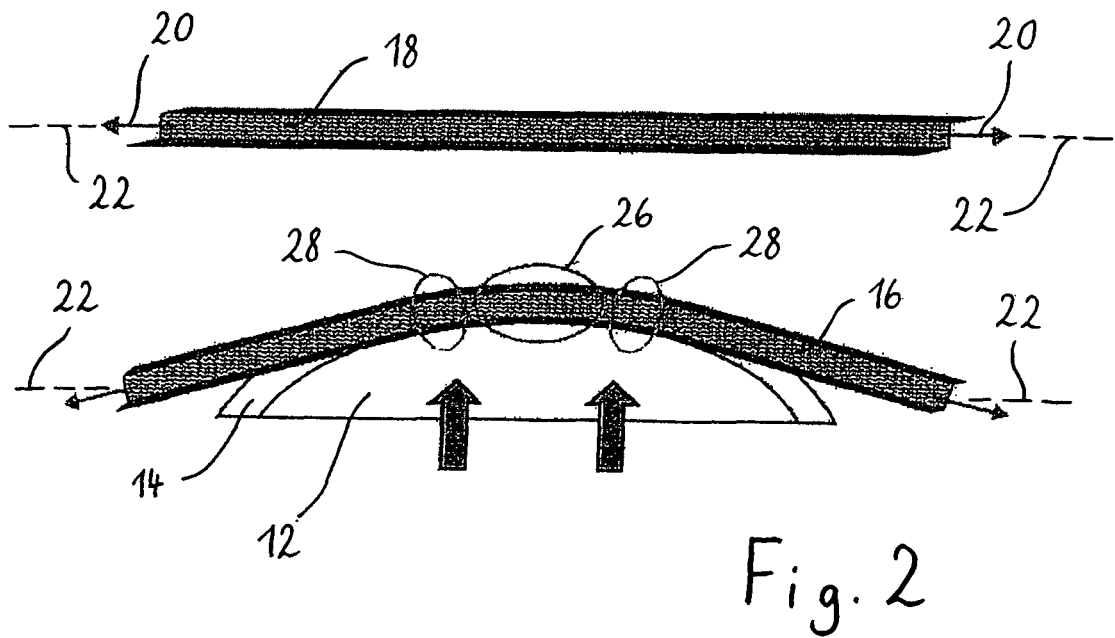

The further the mold 12, more precisely the mold surface 14 thereof, pushes through the tensioning line 22, the greater the area of the mold surface 14, to which the draped knitted fiber fabric is already applied, becomes. The actual draping operation in this case is carried out at the point where the still freely clamped knitted fiber fabric layer running tangentially towards the mold surface 14 meets the mold surface 14 and, there, is forced by contact therewith into the configuration defined by the mold surface 14. In FIG. 2 an area denoted by 26 represents a portion of the knitted fiber fabric layer 16 that has already been completely draped, whereas the two areas denoted by 28 to the right and left of the area 26 represent portions of the knitted fiber fabric layer 16, at which the draping operation is just occurring. Consequently, the mold 12 by means of its mold surface 14 imposes the profile geometry on the knitted fiber fabric layer 16. Differences in length between an external- and internal flange of the knitted fiber fabric layer 16 that result from the defined curvature of the mold surface 14 are compensated in the course of draping in the areas 28 by virtue of a correspondingly different elongation of the knitted fiber fabric, with the result that the knitted fiber fabric layer 16 adapts precisely to the mold surface 14.

Once the first knitted fiber fabric layer 16 has been draped in the described manner onto the mold surface 14, a further continued movement of the mold 12 by means of the movement device 24 in the indicated direction results in the second knitted fiber fabric layer 18 also being draped onto the mold surface 14, or more precisely onto the first knitted fiber fabric layer 16, in an identical manner to that described in connection with the draping of the first knitted fiber fabric layer 16. The clamping device 20 may be configured in such a way that it takes into account the "shortening" of each knitted fiber fabric layer, which occurs during the draping operation as a result of the mold surface 14 being curved in longitudinal direction, for example in that the non-illustrated clamping elements in the course of the draping is operation of a knitted fiber fabric layer move progressively inwards along the tensioning line 22 in order in this way to keep the tensile force acting upon each knitted fiber fabric layer constant.

In the illustrated embodiment the mold 12 is moved in the direction of the knitted fiber fabric layers 16, 18. It is however self-evident that the mold 12 may alternatively be held stationary and the clamping device(s) 20 together with the clamped-in knitted fiber fabric layers 16, 18 may instead be moved in the direction of the mold 12 in order to drape the knitted fiber fabric layers 16, 18 onto the mold surface 14.

What is claimed is:

1. A method of forming a curved profiled structural part from a fiber composite material having at least one layer of a knitted fiber fabric with an applied or impregnated binding material, the method comprising:

providing at least one mold defining a mold surface that is curved in a longitudinal direction and that defines a three-dimensional cross-sectional shape transversely of the longitudinal direction thereof such that the mold surface defines at least a portion of a profile geometry and curvature of the curved profiled structural part, applying a tensile stress to opposite ends of the at least one layer of the knitted fiber fabric along a tensioning line that extends through the opposite ends and along a longitudinal direction of the at least one layer of the knitted fiber fabric, parallel to the longitudinal direction of the mold surface, to tension the at least one layer of the knitted fiber fabric with a tensioning force acting along the tensioning line, the tensile stress being applied so as to result in a cross-sectional shape of the tensioned at least one layer of the knitted fiber fabric, which tranverse the tensioning line, corresponding to the cross-sectional shape of the mold surface, executing a relative movement between the tensioned at least one layer of the knitted fiber fabric and the mold surface to reduce a distance between the tensioned at least one layer of the knitted fiber fabric and the mold surface, continuing the relative movement while maintaining the tensioning force acting along the tensioning line until the mold surface pushes through the tensioning line to such an extent that the at least one layer of knitted fiber fabric completely covers the mold surface, and with the at least one layer of knitted fiber fabric completely covering the mold surface, curing the binding material while continuing to maintain the tensioning force acting along the tensioning line to cause the at least one layer of knitted fiber fabric and the binding material to cooperatively yield the fiber composite material fixed in the shape of the mold surface to form the curved profiled structural part.

2. The method of claim 1, wherein
applying the tensile stress to opposite ends of the at least one layer of the knitted fiber fabric comprises moving the opposite ends of the at least one layer of the knitted fiber fabric progressively inwardly along the tensioning line so as to maintain the tensioning force acting on the at least one layer of the knitted fiber fabric constant as the curved mold surface of the mold pushes through the tensioning line.

3. The method of claim 1, wherein executing the relative movement comprises executing the relative movement between the tensioned at least one layer of the knitted fiber fabric and a plurality of different mold surfaces each defined by a different one of a plurality of molds, wherein the plurality of different mold surfaces together form the mold surface of the at least one mold.

4. The method of claim 1, wherein the three-dimensional cross-sectional shape of the mold surface defines a Z-shaped cross-section, and wherein applying the tensile stress comprises applying the tensile stress to the at least one layer of the knitted fiber fabric in a manner which results in the tensioned at least one layer of the knitted fiber fabric having the Z-shaped cross-section.

5. The method of claim 1, wherein the at least one layer of knitted fiber fabric comprises a plurality of layers of knitted fiber fabric,
and wherein the method further comprises superimposing the layers of the plurality of layers of knitted fiber fabric one on top of another,
and wherein applying the tensile stress comprises applying the tensile stress to the opposite ends of the plurality of superimposed layers of knitted fiber fabric.

6. A method of forming a curved profiled structural part from a fiber composite material, the method comprising:
obtaining at least one layer of a knitted fiber fabric with an applied or impregnated binding material,
providing at least one mold defining a mold surface that is curved in a longitudinal direction and that defines a three-dimensional cross-sectional shape transversely of the longitudinal direction thereof such that the mold surface defines at least a portion of a profile geometry and curvature of the curved profiled structural part,
applying a tensile stress to opposite ends of the at least one layer of the knitted fiber fabric along a tensioning line that extends through the opposite ends and along a longitudinal direction of the at least one layer of the knitted fiber fabric, parallel to the longitudinal direction of the mold surface, to tension the at least one layer of the knitted fiber fabric with a tensioning force acting along the tensioning line, the tensile stress being applied so as to result in a cross-sectional shape of the tensioned at least one layer of the knitted fiber fabric, which transverse the tensioning line, corresponding to the cross-sectional shape of the mold surface,
while maintaining the tensioning force acting along the tensioning line, executing a relative movement between the tensioned at least one layer of the knitted fiber fabric and the mold surface until the mold surface pushes through the tensioning line to such an extent that the at least one layer of knitted fiber fabric completely covers the mold surface, and
with the at least one layer of knitted fiber fabric completely covering the mold surface, curing the binding material while continuing to maintain the tensioning force acting along the tensioning line to cause the at least one layer of knitted fiber fabric and the binding material to cooperatively yield the fiber composite material fixed in the shape of the mold surface to form the curved profiled structural part.

7. The method of claim 6, wherein
applying the tensile stress to opposite ends of the at least one layer of the knitted fiber fabric comprises moving the opposite ends of the at least one layer of the knitted fiber fabric progressively inwardly along the tensioning line so as to maintain the tensioning force acting on the at least one layer of the knitted fiber fabric constant as the curved mold surface of the mold pushes through the tensioning line.

8. The method of claim 6, wherein executing the relative movement comprises executing the relative movement between the tensioned at least one layer of the knitted fiber fabric and a plurality of different mold surfaces each defined by a different one of a plurality of molds, wherein the plurality of different mold surfaces together form the mold surface of the at least one mold.

9. The method of claim 6, wherein the three-dimensional cross-sectional shape of the mold surface defines a Z-shaped cross-section,
and wherein applying the tensile stress comprises applying the tensile stress to the at least one layer of the knitted fiber fabric in a manner which results in the tensioned at least one layer of the knitted fiber fabric having the Z-shaped cross-section.

10. The method of claim 9, wherein the at least one layer of knitted fiber fabric comprises a plurality of layers of knitted fiber fabric,
and wherein the method further comprises superimposing the layers of the plurality of layers of knitted fiber fabric one on top of another,
and wherein applying the tensile stress comprises applying the tensile stress to the opposite ends of the plurality of superimposed layers of knitted fiber fabric.

11. The method of claim 6, wherein obtaining the at least one layer of knitted fiber fabric comprises obtaining the at least one layer of knitted fiber fabric in the form of at least one prepreg.

12. The method of claim 6, wherein obtaining the at least one layer of knitted fiber fabric comprises obtaining the at least one layer of knitted fiber fabric in the form of at least one prefabricated layer of knitted fiber fabric.

13. A method of forming a curved profiled structural part from a fiber composite material, the method comprising:
obtaining a plurality of layers of knitted fiber fabric, at least one of the plurality of layers of knitted fiber fabric including an applied or impregnated binding material,
spacing apart each of the plurality of layers of knitted fiber fabric at a distance from one another,
providing at least one mold defining a mold surface that is curved in a longitudinal direction and that defines a three-dimensional cross-sectional shape transversely of the longitudinal direction thereof such that the mold surface defines at least a portion of a profile geometry and curvature of the curved profiled structural part,
applying tensile stress to opposite ends of the spaced apart plurality of layers of knitted fiber fabric each along a different one of a corresponding plurality of tensioning lines extending through the opposite ends thereof along a respective longitudinal direction parallel to the longitudinal direction of the mold surface to tension each of the spaced apart plurality of layers of knitted fiber fabric with a tensioning force acting along a corresponding one of the plurality of tensioning lines, the tensile stress being applied so as to result in cross-sectional shapes of the spaced apart and tensioned plurality of layers of knitted fiber fabric, which transverse the respective tensioning lines, corresponding to the cross-sectional shape of the mold surface,
while maintaining the tensioning force acting along each of the plurality of tensioning lines, executing a relative movement between the spaced apart and tensioned plurality of layers of knitted fiber fabric and the mold surface until the mold surface pushes sequentially through each of the plurality of tensioning lines to such an extent that the sequentially arranged plurality of layers of knitted fiber fabric completely covers the mold surface, and
with plurality of layers of knitted fiber fabric completely covering the mold surface, curing the binding material while continuing to maintain the tensioning force acting along the plurality of tensioning lines to cause the plurality of layers of knitted fiber fabric and the binding material to cooperatively yield the fiber composite material fixed in the shape of the mold surface to form the curved profiled structural part.

14. The method of claim 13, wherein executing the relative movement comprises executing the relative movement between the plurality of layers of knitted fiber fabric and a plurality of different mold surfaces each defined by a different one of a plurality of molds, wherein the plurality of different mold surfaces together form the mold surface of the at least one mold.

15. The method of claim 13, wherein the three-dimensional cross-sectional shape of the mold surface defines a Z-shaped cross-section,
    and wherein applying the tensile stress comprises applying the tensile stress to the plurality of knitted fiber fabrics in a manner which results in the tensioned plurality of knitted fiber fabrics having the Z-shaped cross-sections.

16. The method of claim 13, wherein obtaining the plurality of layers of knitted fiber fabric comprises obtaining at least one of the plurality of layers of knitted fiber fabric in the form of at least one of a prepreg and a prefabricated layer of knitted fiber fabric.

\* \* \* \* \*